US008615399B2

(12) United States Patent
Birimisa et al.

(10) Patent No.: US 8,615,399 B2
(45) Date of Patent: Dec. 24, 2013

(54) TOOL FOR EVALUATION OF BUSINESS SERVICES

(75) Inventors: Miho Emil Birimisa, Karisruhe (DE); Heinrich Wegener, Heidelberg (DE)

(73) Assignee: SAP AG, Walldorf (DE)

( * ) Notice: Subject to any disclaimer, the term of this patent is extended or adjusted under 35 U.S.C. 154(b) by 3797 days.

(21) Appl. No.: 10/372,009

(22) Filed: Feb. 21, 2003

(65) Prior Publication Data

US 2004/0167788 A1    Aug. 26, 2004

(51) Int. Cl.
G06Q 10/00  (2012.01)
G06Q 30/00  (2012.01)

(52) U.S. Cl.
USPC ............................ 705/1.1; 705/7.36; 705/347

(58) Field of Classification Search
USPC ...................................... 705/1, 1.1, 7.36, 347
See application file for complete search history.

(56) References Cited

U.S. PATENT DOCUMENTS

| | | | |
|---|---|---|---|
| 4,674,042 A | | 6/1987 | Hernandez et al. |
| 5,765,138 A | * | 6/1998 | Aycock et al. ..................... 705/7 |
| 5,826,085 A | * | 10/1998 | Bennett et al. ................ 719/316 |
| 5,884,287 A | | 3/1999 | Edesess |
| 6,119,149 A | | 9/2000 | Notani |
| 6,151,707 A | | 11/2000 | Hecksel et al. |
| 6,169,979 B1 | * | 1/2001 | Johnson ........................ 705/412 |
| 6,249,769 B1 | * | 6/2001 | Ruffin et al. ...................... 705/7 |
| 6,256,676 B1 | | 7/2001 | Taylor et al. |
| 6,345,239 B1 | | 2/2002 | Bowman-Amuah |
| 2002/0143677 A1 | * | 10/2002 | Prakash .......................... 705/35 |
| 2003/0145006 A1 | * | 7/2003 | Dalfsen et al. ................. 707/10 |
| 2003/0187675 A1 | * | 10/2003 | Hack et al. ....................... 705/1 |

OTHER PUBLICATIONS

Thomas Hess/Leo Brecht, State of the Art Des Business Process Redesign—Darstellung und Vergleich bestehender Methoden, Gabler, 1995 (with English translation) Scheer, *Business Process Engineering*, 2nd Edition, Springer-Verlag, 1994 (Table of Contents Only).
Sabatine Scelza, *Information Technology Support for Supply Chain Management*, Dissertation, Johann Wolfgang Goethe University, Aug. 13, 1999, (English translation attached).
*ARIS Toolset*, IntelliCorp, Data sheet [on-line] from Collaborative Processes Integration website Retrieved from the Internet Mar. 6, 2003 at URL: http://cpi.co.za/products/toolset.html.
*ARIS Toolset*, IntelliCorp, Data sheet from IDS Scheer Inc. 1205 Westlakes Drive, Suite 270, Berwyn, PA 19312.
*Ascendant Methodology*, PriceWaterhouseCoopers, Marketing data release [on-line]. Retrieved from the Internet Mar. 9, 2003 at URL: http://www.pwcglobal.com/Extweb/service.nsf/docid/B5DF953737D8C8E180256A0D005B9FC1.
*Business Case Analysis*, Oracle Corp., Data sheet [on-line]. Retrieved from the Internet Mar. 9, 2003 at URL: http://www.oracle.com/consulting/offerings/strategy/sva_ds.html.

* cited by examiner

*Primary Examiner* — Fonya Long
(74) *Attorney, Agent, or Firm* — Fish & Richardson P.C.

(57) ABSTRACT

A tool for evaluating support services may correlate those services with an array of factors that define a business environment and then identify the business services that are most directly correlated to those factors. In exemplary embodiments, a tool may prompt a user for input concerning business issues and objectives; correlate those issues and objectives to a plurality of available software support services such as maintenance, optimization, architecture planning, implementation, administration and systems integration services; select the services that most directly address the particular needs and objectives identified by the user; and calculate a return on investment (ROI) associated with satisfaction of identified business objectives through implementation of the selected support services.

28 Claims, 9 Drawing Sheets

| Service ~20 | Associated Cost ~22 | Phase ~23 | Associated Business Issue ~24 | Associated Business Goal ~26 |
|---|---|---|---|---|
| | | | | |
| | | | | |
| | | | | |

FIG. 2

TOOL FOR EVALUATION OF BUSINESS SERVICES

TECHNICAL FIELD

This disclosure relates to tools for evaluation of business services and, in certain illustrative embodiments, to software applications for recommendation and valuation of business software management and optimization services.

BACKGROUND

Businesses often utilize software tools to facilitate their internal operations and interactions with other businesses, particularly in industries dependent on extensive network communication. In order to determine which software applications will optimize operations or inter-corporate communications, a corporation may consider the business processes associated with its particular industry as well as the business processes associated with the relevant roles (e.g. manufacturer, distributor) within that industry. By filtering the potentially relevant business processes by both industry and applicable roles, it is possible to effectively identify the business processes that most directly impact a company's costs and revenue streams. Business applications, suites, and platforms can then be selectively implemented so as to optimize the most critical process flows within an enterprise and thereby avoid expenditures on software that is not likely to generate substantial cost savings or revenue. That, in turn, maximizes the return on an investment in business software.

The potential return on an investment for such business applications may not be realized, however, without the contemporaneous implementation of appropriate support services such as maintenance, optimization, risk management, education, architecture planning, implementation, administration and systems integration. Maintenance systems include applications to monitor the critical portals, platforms and other applications to ensure that they are operating efficiently and reliably. Optimization services assist with capacity planning, configuration management, performance optimization, data management and system administration. Architecture planning services address issues such as design of system landscape, degree of centralization, and network topology. Implementation services assist with conceptualization and the technical implementation of business processes. Systems integration services integrate pre-existing systems with newly purchases business software solutions. These and other support services in many circumstances significantly enhance the efficiencies that business software applications are designed to provide.

Due to the significant number of support services available, it is often difficult for businesses to determine which services will most effectively compliment the business software that has already been selected or deployed. There is a need, therefore, for tools that assist in the identification of the software-related services that should be implemented in particular business environments to maximize the effectiveness of and increase the savings derived from business applications, suites, portals and platforms.

SUMMARY

A tool for evaluating support services may correlate those services with an array of factors that define a business environment and then identify the business services that are most directly correlated to those factors. In exemplary embodiments, a tool may prompt a user for input concerning business issues and objectives; correlate those issues and objectives to a plurality of available software maintenance, optimization, architecture planning, implementation, administration and systems integration services; and then select the services that most directly address the particular needs and objectives identified by the user.

In some embodiments, the selection process may involve calculating a relevancy score for the available service in common with user-identified business issues and objectives, comparing the relevancy score to a pre-determined or threshold value, and determining a recommended service based on the comparison.

Various embodiments may also compute the savings associated with the implementation of the selected business services. For example, an application may suggest saving rates associated with a cost-saving objective, receive an input selecting a savings rate, receive an input concerning a budget against which the savings rate can be applied, repeat these steps for each identified objective, compute the total savings associated with satisfaction of the identified objectives, and then compute the total savings associated with the implementation of the selected support services.

A system, as well as articles that include a machine-readable medium storing machine-readable instructions for implementing the various techniques, are disclosed. Details of certain illustrative implementations are discussed in greater detail below.

BRIEF DESCRIPTION OF THE DRAWINGS

FIG. 2 illustrates a data structure for a knowledge base.

DETAILED DESCRIPTION OF ILLUSTRATIVE EMBODIMENTS

Illustrative business service evaluation platforms may identify based on user inputs the software-related business services that best optimize the process flows in which a target company participates, project the costs and savings associated with implementation of the selected business services, and calculate the net return on investment in the selected business services. In various implementations, the foregoing functionality may be provided by a software application tool accessed through a network.

Figure 1:
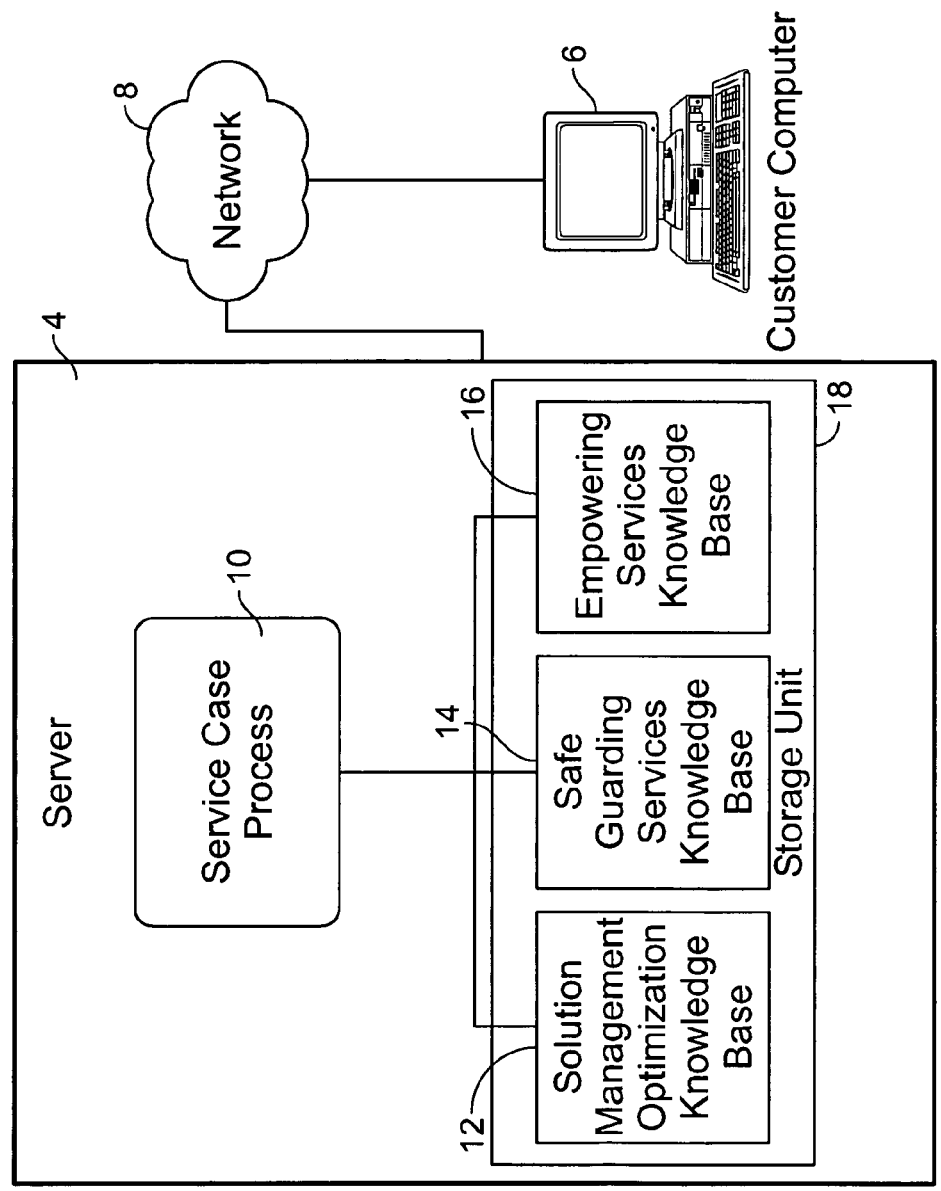
FIG. 1 illustrates a network-based software service evaluation system.

FIG. 1 is a block diagram of a network-based evaluation system. In one embodiment, the system includes a server 4 that executes a "service case" process 10 that may be accessed by a user using computer device 6 over a network 8. Server 4 may include one or more storage unit 18 that stores a solution management knowledge base 12, a safeguarding knowledge base 14, and an empowering knowledge base 16, each of which will be described in more detail below. Although three knowledge bases are disclosed in FIG. 1, the system may be readily configured to support additional knowledge bases.

In other embodiments, the system may be configured on a single computing device and execute service case process 10 without access to knowledge bases. Service case builder process 10 and knowledge bases may be deployed onto a stand alone platform, such as a desktop or laptop personal computer. Alternately, a mobile device may provide a front end for the network-based system.

Returning to FIG. 1, the server 4 may include, for example, an Internet-accessible server. Service case process 10 may be distributed and executed on one or more computer servers. Knowledge repository 18 may be used by service case process 10 to store and retrieve information relating to the operation of the system. Network 8 may include a plurality of devices such as servers, routers, switches, bridges and the like connected in an intranet, extranet, or Internet configuration.

A user may use computer device 6 to access computer server 4 over network 8. Computer device 6 may include a personal computer (PC), a personal digital assistant, or other device using wireless or wired communication protocols to access computer server 4. Computer device 6 may be coupled to I/O devices that may include a keyboard in combination with a pointing device such as a mouse (not shown) to input data into the computer, a computer display screen or printer (not shown) to produce output from the computer, a storage resource such as a hard disk drive (not shown) for storing and retrieving data for the computer, and other I/O devices.

In some embodiments, knowledge repository 18 may include individual knowledge bases comprising information relevant to providing recommendations, recommendation costs, projected savings associated with achieving user objectives, and a projected payoff. In one embodiment, for example, knowledge repository 18 may store information relating to project implementations and operational support. In other embodiments, the system may manage and store information relating to recommendations, cost, and payoff projections in computer memory and executable code.

In one embodiment, for example, a solution management knowledge base 12 may include business services available to a user. One or more business issues, goals and objectives may be associated with each service in the solution management knowledge base 12. In other embodiments, the associations between issues, goals, objectives and services are stored in volatile memory or executable code.

A safeguarding knowledge base 14 is provided that may store information relating to protecting investments in the services included in the solution management knowledge base 12. In one embodiment, safeguarding knowledge base 14 may store information relating to factors indicative of whether one or more support services should be deployed during implementation, upgrade, and migration projects to prevent disruption of operations or process flows. More particularly, safeguarding knowledge base 14 may store information relating to one or more implementation safeguarding services and also may store one or more business issues and goals associated with implementation safeguarding services. As an illustration, safeguarding knowledge base 14 could store a speed to market business goal with one implementation safeguarding service and a high quality assurance business goal with another implementation safeguarding service.

An empowering knowledge base 16 may be provided that contains information relating to ongoing support of implementations. In one embodiment, for example, empowering knowledge base 16 contains information relating to course training and seminars that may support and enhance project operations and other process flows. Empowering knowledge base 16 may also store one or more business issues and business goals that each training course and seminar may be designed to accomplish.

Turning now to FIG. 2, a data structure for solutions management knowledge base 12 may include a service attribute 20, a service location (not shown), one or more associated costs 22, one or more associated phases 23, one or more associated business issues 24 relating to service attribute 20, and one or more associated business goal 26 relating to service attribute 20.

Service attribute 20 provides a field to store the name of a service that may be recommended by the system. In one embodiment, each service may be represented by an entry in the service attribute field 20. Service location (not shown) provides a field to store a directory location of or URL associated with additional information relating to service attribute 20. In one embodiment, for example, service location 20 may store a directory path to a file containing associated resources or further data.

Associated cost 22 provides a field to store cost information associated with implementation of the service 20. In certain embodiments, a single aggregate cost value is encoded in the associated cost field.

Phase 23 provides a field for storing information associated with the phase to which the service related. In illustrative embodiments, the phase field includes designations for "implementation," "operations" or both. As will be appreciated from the following description, the phase value can be used to customize the services considered for recommendation depending on a user's input concerning the relevant phase of a project.

Associated business issue 24 provides a field to store one or more business issues and concerns relating to service attribute 20. In one embodiment, for example, associated business issue 24 may store one or more business issues that a service may be designed for. In another embodiment, associated business issue 24 may store one or more business issues that at least a certain number of previous users considered while deciding upon a service. Similarly, associated business goal 26 provides a field to store one or more business goals and objectives relating to service attribute 20. In one embodiment, for example, associated business goal 26 may store one or more business objectives that for which a service may be designed. In another embodiment, associated business goal 26 may store one or business objectives that at least a certain number of previous users considered while deciding upon a service.

In various embodiments, the system includes a graphical user interface to facilitate input and output to and from service case process 10. Graphical user interface may execute on computer server 4 and/or computer device 6 depending upon a particular network configuration. Graphical user interface may include a case builder screen 30, an issues screen 55, an objectives screen 57, a calculation screen 61 and a report screen 63, as shown in FIGS. 3-8.

Figure 3:
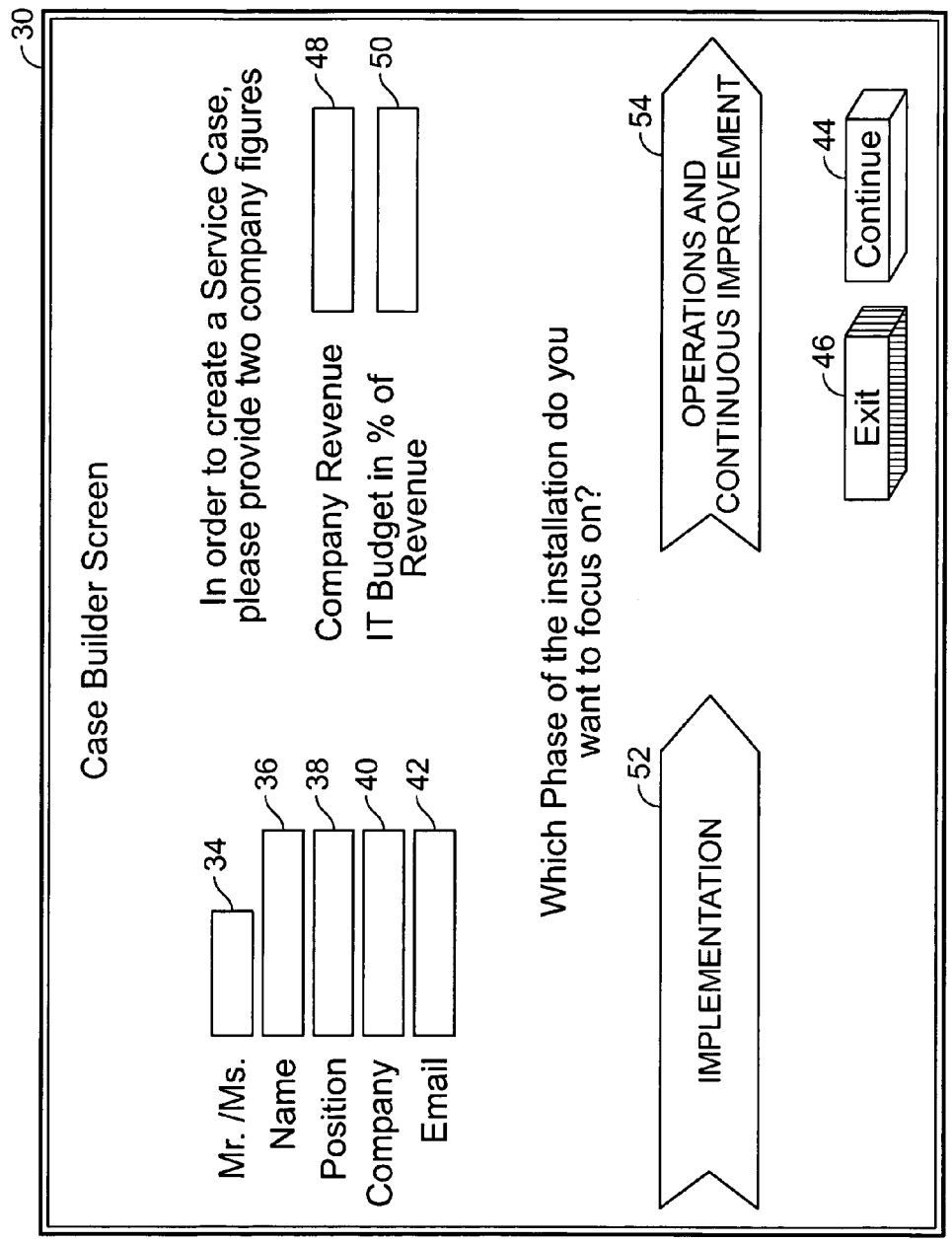
FIG. 3 illustrates a graphical user interface for creating a business case.

Referring to FIG. 3, case builder screen 30 allows for the generation of business cases in the system. A business case may be used to store user information, business information and system output. One advantage of generating a business case may be that a user at a point in the future may access and modify previously selected inputs as changes occur and generate new system recommendations, projected costs and a projected payout using the modified inputs. Another advantage may be that information stored in the business case may be used by the system to communicate with the user. As illustrated in FIG. 3, for example, case builder screen 30 provides a salutation 34 and name 36 input field that may be used for identifying the user, a position input field 38 that may used to identify the user in an organizational hierarchy, a company input field 40 that may be used to identify the user's particular industry, and an electronic mail (e-mail) input field 42 that may be used for correspondence with the user.

Case builder screen 30 further provides a company revenue input field 48 that may accept an enterprise's total annual revenue figure and an investment technology budget input field 50 that the user may use for an enterprise's annual percentage of revenue expended on investment technology. Values entered into company revenue input field 48 and investment technology budget input field 50 may be passed as input to service case process 10 to determine projected cost savings and the projected payoff.

Case builder screen 30 may allow the user to focus on a particular stage in a projects life cycle for analysis and recommendations. For example, an implementation phase 52 and an operations and continuous improvement phase 54 may be provided. Upon selecting implementation phase 52, a series of issues, objectives, and suggested cost savings relating to project implementation may be displayed to the user for input that may be passed to service case process 10 for system recommendations. Similarly, upon selecting operation and continuous improvement phase 54, a series of issues, objectives and suggested cost savings relating to the operations and continuous improvement phase of a project may be displayed to the user for input that may be passed to service case process 10 for system recommendations.

Once a phase of installation is selected and the user selects continue button 44, an issues screen 55 may be displayed. Exit button 46 may also be provided to terminate execution of graphical user interface 28.

Figure 4:
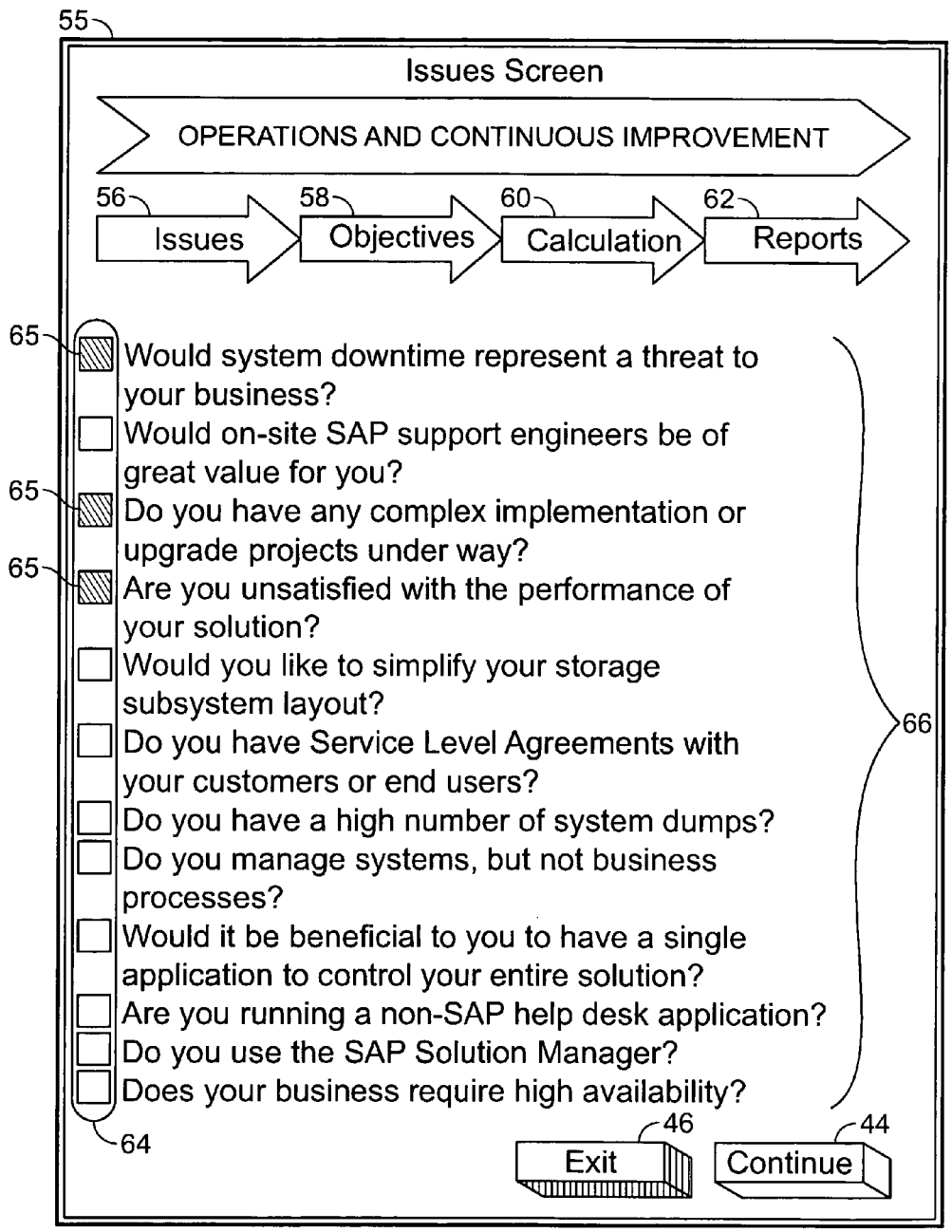
FIG. 4 illustrates a graphical user interface for selecting user issues for system analysis.

Issues screen 55 is provided to display business issues and accept user selected business issues of concern. Referring to FIG. 4, for example, issues screen 55 may display a fixed list 66 of business issues or rather a customized or filtered list of business issues based on an input concerning relevant industries, roles, business processes, or the like. In one embodiment, service case process 10 may derive business issue list 66 by querying one or more knowledge bases for business issues associated with relevant roles and business processes. In other embodiments, service case process 10 may derive business issue list 66 by determining the type of industry the user may be associated with and querying business cases for business issues that were considered by previous users in the same industry. In various embodiments, service case process 10 may derive business issue list 66 by accessing executable code and determining relevant issues according to an algorithm. Once business issue list 66 is displayed, issues screen 55 may provide a selection mechanism 64 wherein the user may select one or more business issue list 66 items that may be of concern. As illustrated in FIG. 4, user selected business issues 65 may be selected by utilizing selection mechanism 64.

Figure 5:
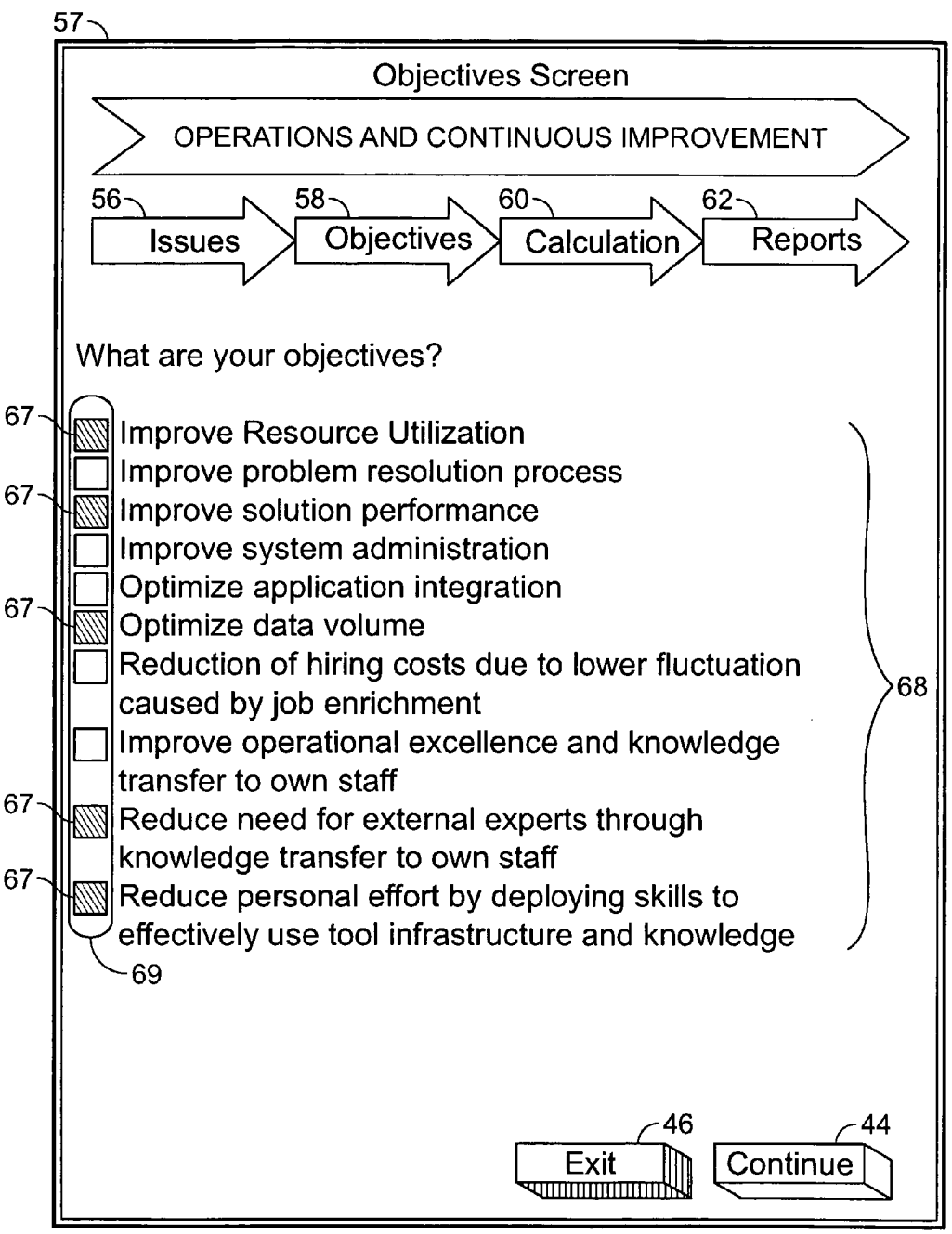
FIG. 5 illustrates a graphical user interface for selecting user objectives for system analysis.

Once an issue selection has been completed and the user selects continue button 44, an objectives screen 57 may be displayed, as shown in FIG. 5. In other embodiments, objective screen 57 may be displayed prior to issue screen 55. Objectives screen 57 is provided to display business objectives and accept user selected business objectives of concern. As with the issue screen, the objective screen 57 may display a fixed list of business objectives or a customize or filtered list of business objectives. In one embodiment, service case process 10 may derive business objective list 68 by querying knowledge bases for associated processes, roles, industries, etc. In some embodiments, service case process 10 may derive business objective list 68 by determining the type of industry the user may be associated with and querying business cases for business objectives that were considered by previous users in the same industry. In other embodiments, service case builder 10 may derive business objective list 68 by accessing stored areas in memory and executable code. Once business objective list 68 is displayed, objective screen 57 may provide a selection mechanism 69 wherein the user may select one or more business objective list 68 items that may be of user concern. As illustrated in FIG. 5, user selected business goals 67 may be selected by utilizing selection mechanism 69. In one embodiment, once an objective selection is completed and the user selects continue button 44, a calculation screen may be displayed.

Figure 6:
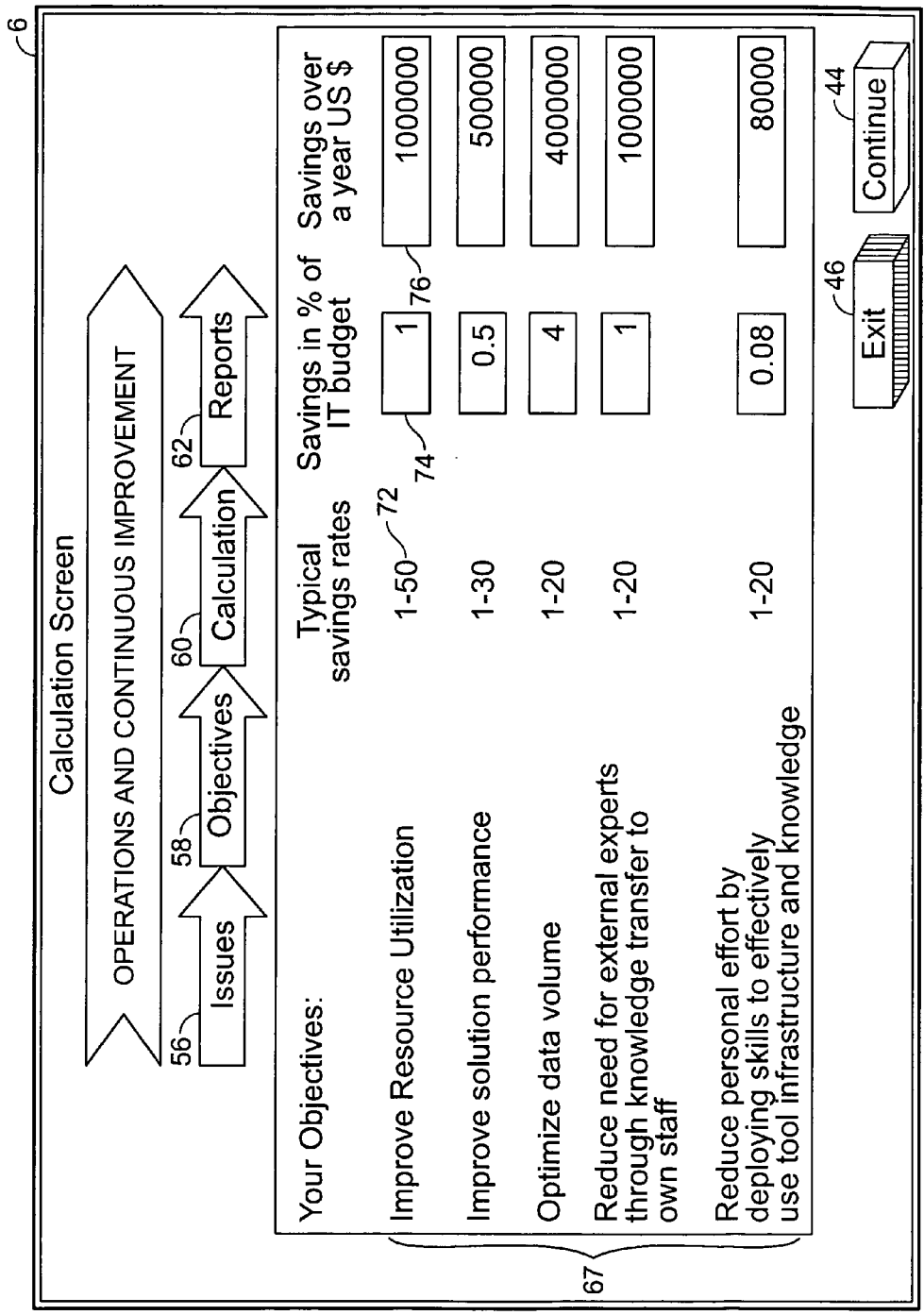
FIG. 6 illustrates user selected objectives and suggested savings rates and projected savings metrics for user selected objectives.

Turning now to FIG. 6, calculation screen 61 is provided to accept user-estimated cost savings associated with achieving one or more user selected goals 67 and to display suggested savings rates, projected savings rates, and projected savings amounts calculated by service case process 10. In one embodiment, referring to FIG. 6, calculation screen 61 may display user-selected goals 67 and a suggested savings rate range 72 that may be used as estimation guidance for a user. In one embodiment, service case process 10 may determine suggested savings rate range 72 by using one or more prior user estimated cost savings associated with a particular objective. Referring to FIG. 6, for example, prior user estimates of improving resource utilization may typically have ranged from 1% to 50% of an investment technology budget. In some embodiments, service case process 10 may determine suggested savings rate range 72 by using one or more actual prior user cost savings associated with a particular objective. In some embodiments, case builder process 10 may determine suggested savings rate range 72 by using the user's industry specific cost savings rate achieved by implementing one or more objectives. In other embodiments, projected savings rate 72 may be calculated based upon industry specific cost saving attained in a user's industry.

Calculation screen 61 may provide a savings rate input field 74 to input user estimated cost savings rates and a savings amount input field 76 to input an estimated cost savings amount. By entering an estimated savings rate into savings rate input field 74, service case builder process 10 may compute a projected cost savings amount by multiplying the estimated cost savings rate by the value entered in investment technology budget input field 50. Calculation screen 61 may then display the projected cost savings amount in the savings amount input field 76. Alternately, by entering an estimated cost savings amount in savings amount input field 76, service case process 10 may compute a projected estimated cost savings rate by dividing the value entered in investment technology budget input field 50 by the estimated cost savings amount. Calculation screen 61 may then display the projected cost savings rate in savings rate input field 74.

Figure 7:
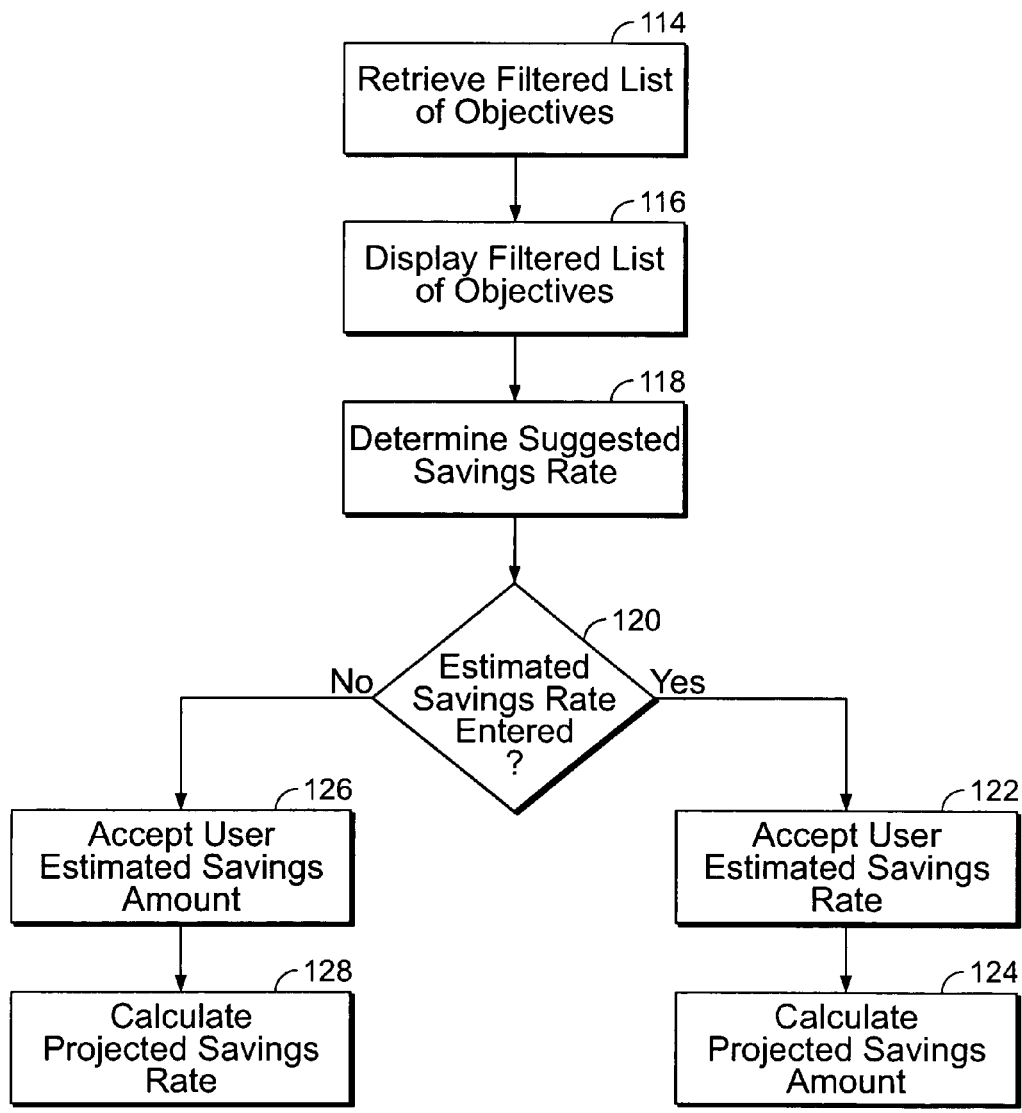
FIG. 7 is a flow diagram of a process for calculating potential savings.

Referring to FIG. 7, a methodology for calculating potential savings utilized by case builder process 10 is disclosed. As previously illustrated in FIG. 5, a list of business objectives may be displayed to the user. Upon a user selecting one or more business issues, a filtered list of objectives representing the user selection is obtained (114) and displayed (116). Next, a suggested savings rate may be determined (118) for each business issue and displayed to the user as guidance for entering a user estimated savings rate. If a user estimated savings rate is entered (120) for a business issue, the user estimated savings rate is accepted (122) and passed as input to service case process 10 to calculate a projected savings amount 124.

Alternatively, if a user estimated savings amount is entered for a business issue, the user estimated savings amount is accepted (126) and passed as input to service case process 10 to calculate a projected savings rate (128).

Figure 8:
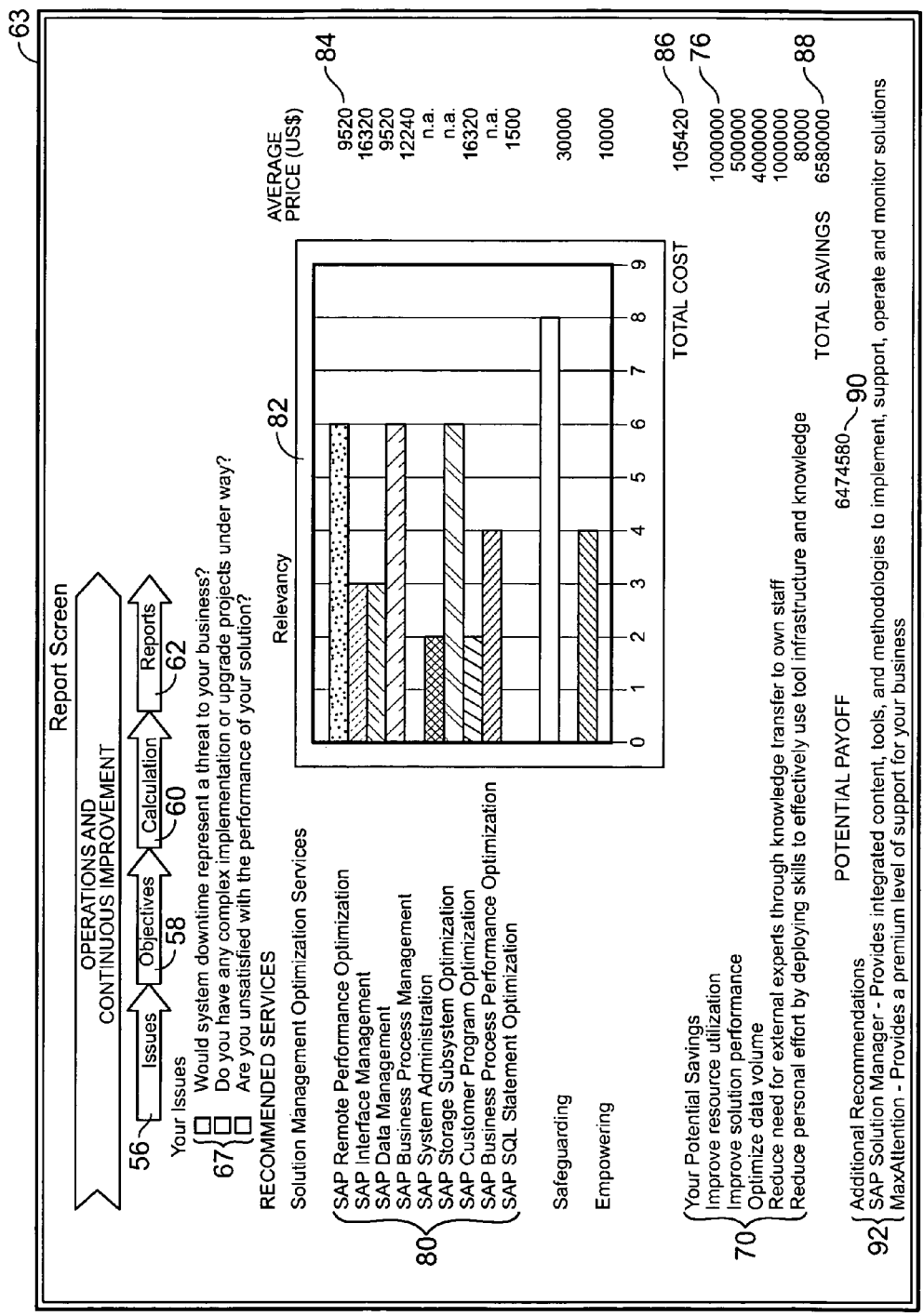
FIG. 8 illustrates recommendations, projected costs, projected payoffs, and additional recommendations provided by the system of FIG. 1.

Once service case process 10 calculations have been performed and the user selects continue button 44, a report screen 63 may be displayed as shown in FIG. 8. Report screen 63 is provided to display service recommendations, projected costs and projected payoffs determined by service case process 10. In one embodiment, referring to FIG. 8, report screen 63 may display output from service case process 10 including user selected issues 67, one or more service recommendations 80, a score chart 82 indicating a relevancy of one or more recommended services to user selected issues 67 and user selected objectives 70, a cost associated with recommended services 84, a total projected cost 86 associated with implementing recommended services 80, user selected objectives 70 and associated estimated cost savings 76, a total projected costs savings amount 88, a total projected payoff amount 90 and one or more additional recommendations 92.

Figure 9:
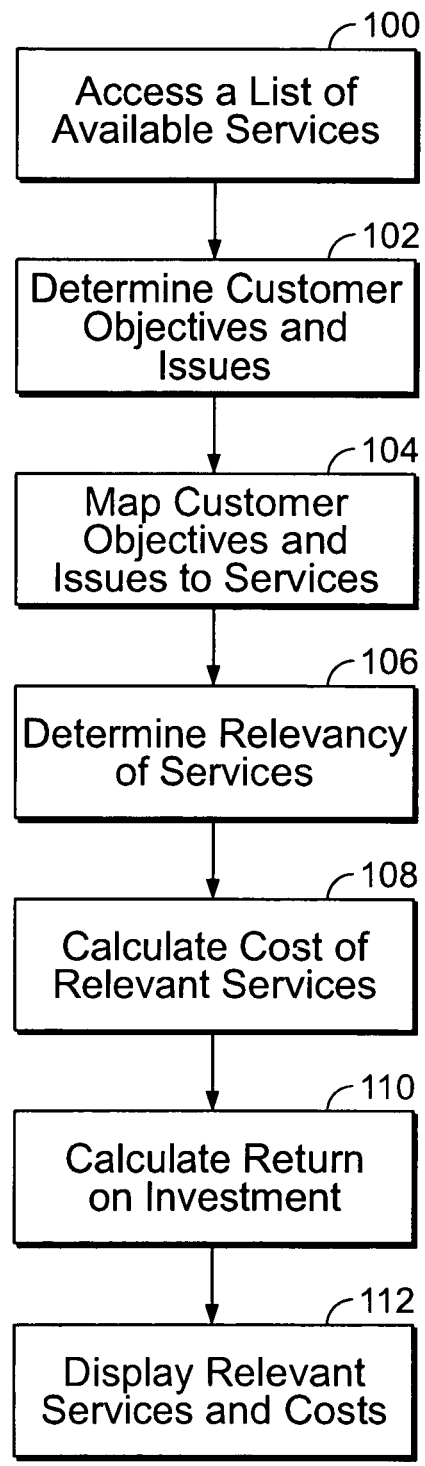
FIG. 9 a flow diagram of a process for determining recommendations and costs.

Referring to FIG. 9, a methodology for providing service recommendations and costs is disclosed. A service case process 10 may determine a list of available services (100). In one embodiment, for example, service case process 10 may scan one or more knowledge base data structures and access service attribute 20 to determine available services. In other embodiments, service case process 10 may determine the list of available services by accessing areas in computer memory or areas in executable code storing available services. Once the list of available services is determined, service case process 10 may then determine user objectives and user issues 102. The instant methodology for providing relevant recommendations and costs is independent of whether user objectives or user issues are determined first. In one embodiment, as described earlier, the determination of user objectives and issues may be accomplished by accessing user selected issues 67 and user selected objectives 70. In another embodiment, determination of user issues and objectives may be accomplished by identifying the issues and objectives that previous users of the system in the same industry have identified.

Once user objectives and user issues are determined (102), service case process 10 may map user issues and user objectives to the list of available services (104) to identify the most relevant services. In one embodiment, service case process 10 may map user selected issues 67 against the data structures discussed above in connection with FIG. 2 to determine which services are associated with each selected issue. Similarly, service case process 10 may determine which services are associated with the user selected objectives 70 by mapping the objectives against the same data structures. Each occurrence of an association between a service and either an issue or objective is considered a "hit."

Next, service case process 10 may calculate a relevancy score for each service in the list of services (106). A threshold level for relevance can be determined by averaging the number of hits for each service. A service can be deemed relevant, and thus recommended, if the service was "hit" at least the average number of times. For instance, if a first service was associated with one objective and one issue (i.e. 2 hits), a second service was associated with one objective and two issues (i.e. 3 hits), and a third service was associated with three objectives and two issues (i.e. 5 hits), the average number of hits is (2+3+5)/3=3 hits. The second and third service could be deemed relevant and recommend because they have at least the mean number of hits. Various other and relevancy thresholds and calculations may be readily adapted to the systems described herein, including algorithms involving weighted averaging, absolute difference comparisons, statistical correlations, and the like. In other embodiments, a predetermined relevancy threshold may be set during initial system configuration. In still other embodiments, predetermined relevancy schema may be user-defined at the time of business case creation. Relevance may be the sole factor used to drive recommendations, but in other embodiments the relevance may be only one factor determining whether a service will be recommended.

Next, service case process 10 then may determine according to a similar protocol whether safeguarding or empowering services should be recommended, as shown in FIG. 8. The data structures describe above can include a "safeguarding value" indicative of whether previous users found that such an objective or issue implicated business processes that justified or necessitated implementation of the safeguarding tools and services mentioned above. In certain embodiments, the process 10 scans a wider array of data structures associated with a wider array of services to determine whether which services are associated with user selected objectives and issues, determine the number of services which had an associated safeguarding value (i.e. the potential number of safeguarding hits), determine the number of safeguarding hits associated with the recommended services, and then compare the number of potential hits to the number of hits associated with the selected services to determine whether safeguarding services should be recommended. Any of the threshold determination schemes discussed above may be used to determine whether a the number of safeguarding hits associated with the recommended services justifies recommendation of safeguarding services.

A recommendation regarding implementation of the aforementioned empowering services can be established according to similar protocols. The data structures can include fields or values that reflect historical observations concerning whether empowering services are justified in a given circumstances. The process 10 can they execute the same or similar mapping and comparison operations to determine whether an empowering service should be recommended.

Next, service case process 10 then may calculate a cost associated with the relevant and recommended services (108). In some embodiments, costs associated with recommended services may be stored in a data structure or database. In other embodiments, service costs may be stored in memory and in executable code. Once recommended service and cost are determined, service case process 10 may calculate a total cost associated with services recommendations by summing costs associated with the recommended services. The service case process 10 may then calculate an ROI associated with satisfaction of the selected business objectives through implementation of the selected support services according to the methods discussed above (110).

Report screen 63 may display cost savings as previously described and calculated by service process 10 (112). In one embodiment, as illustrated in FIG. 8, report screen 63 may display a total savings value 88 calculated by service case process 10 by summing one or more projected cost savings relating to user selected objectives. Once service case process 10 calculates total cost and total savings, service case process 10 may calculate a projected payoff or ROI 90 by subtracting the total cost value from the total savings value. The computed projected payoff 90 may be displayed on report screen 63.

Report screen 63 may further display additional recommendations 92 that may be recommended by service case process 10. In one embodiment, service case process 10 may recommend certain services as additional recommendations if the user identifies a particular business issue or objective. As illustrated in FIG. 8, for example, a user selected goal of "Improve solution performance" may invoke service case process 10 to recommend as an additional service recommendation "Max Attention" regardless of relevancy calculations. As a further example, a direct evaluation of user profile information or selected issues and objectives can be used to determine whether other services such as "Solution Manager" should be recommended, as where the user having predetermined issues or objectives has indicated that a platform providing certain functionality has not yet been implemented.

Those skilled in the art will appreciate from the foregoing description that the methods and systems identified herein may be advantageously modified in an almost limitless number of ways. For instance, one or more of the foregoing techniques and systems may be advantageously performed in isolation or in any desired combination or order. The software may be configured to be executed on any variety of platforms, such as intranets, wireless networks, and local hard disks by way of non-limiting example. The software may be executed on one or more computers, servers or distributed servers. Any amount of proprietary content may be incorporated into this system, such as propriety business models, industry trends, and market forces. Any aspect of the business process evaluation, value calculations, etc. may be implemented at a finer granularity by use of more detailed information, models, inputs and/or algorithms, for example. None of the particular techniques need be performed in the order indicated unless specifically stated. To the contrary, the techniques may be freely modified by substituting and/or reordering steps as suitable for particular implementations. Any output from the system described herein may be presented in any manner suitable for a particular user, and may incorporate any array of relevant business processes, issues, objectives, needs, and software support and optimization services.

At a fundamental level, the systems and techniques described herein can be adapted to evaluate products instead of services and can similarly be modified to evaluate products or services based on factors other than "issues" or "objectives." Any suitable analytical framework can be used to define and identify the factors that a user may select to describe the business environment for which the products or services are to be purchased.

Various features of the system may be implemented in hardware, software, or a combination of hardware and software. For example, some aspects of the system may be implemented in computer programs executing on programmable computers. Each program may be implemented in a high level procedural or object-oriented programming language to communicate with servers. Furthermore, each computer program may be stored on a storage medium, such as read-only-memory (ROM), readable by a machine, such as a general or special purpose programmable computer, for configuring and operating the machine when the storage medium is read by the machine to perform the functions described above. The systems and techniques described herein may also be implemented in environments without software, including as "paper and pencil" versions.

What is claimed is:

1. A method of evaluating business services comprising:
   receiving at a first computer system, from a second computer system operated by a user, a plurality of user inputs reflecting business factors that define a business environment for a particular business enterprise, the plurality of inputs including a first set of inputs representing business issues selected from a predetermined group of business issues and a second set of inputs representing business objectives selected from a predetermined group of business objectives;
   executing a computer-based process to identify services, the computer-based process including:
      accessing, from computer-readable storage, one or more data structures which associate technology services with the business factors;
      mapping, based on the accessed one or more data structures, the first set of inputs representing business issues to technology services to identify relevant services;
      mapping, based on the accessed one or more data structures, the second set of inputs representing business objectives to technology services to identify relevant services;
      determining a relevancy score for an identified service based on the number of business factors with which the identified service is associated;
      determining comparative relevance of the identified services according to relevancy scores of the identified services;
      selecting a subset of the identified services based on comparative relevance of the identified services, the subset representing recommended services to address at least some of the business issues represented in the first set of inputs and the business objectives represented in the second set of inputs;
   sending the subset of identified services over a network to the second computer system operated by the user for display on a display device associated with the computer system operated by the user;
   sending one or more of cost associated with the identified services, cost savings associated with the identified services and return-in-investment associated with the identified services over the network to the second computer system operated by the user for display on the display device associated with the second computer system operated by the user; and
   storing, in computer-readable storage, a business case for implementing the identified services, the business case including the plurality of inputs, the identified subset of services and one or more of the cost associated with the identified services, the cost savings associated with the identified services and the return-in-investment associated with the identified services.

2. The method of claim 1, further comprising enabling display on the display device associated with the second computer system operated by the user values reflecting the comparative relevance of each of the services in said subset of services.

3. The method of claim 1, further comprising accessing cost information associated with the subset of services and determining a total cost associated with the subset of services.

4. The method of claim 3, further comprising receiving, from the second computer system operated by the user, user inputs concerning savings associated with satisfaction of a business objective and calculating a total savings associated with implementation of the subset of services.

5. The method of claim 1, further comprising enabling display on the display device associated with the second computer system operated by the user the subset of services, costs associated with the subset of services, savings associated with implementation of the subset of services, and a return on investment associated with the subset of services.

6. The method of claim 1, wherein determining the relevancy score comprises determining a relevance threshold based on the average number of business factors associated with the services.

7. The method of claim 1 wherein the data structures also associate additional values with the services.

8. method of claim 7, further comprising accessing the data structures, identifying the additional values associated with the subset of services, and recommending additional services based on those additional values.

9. The method of claim 1, wherein the comparative relevance is determined by comparing the number of said business factors with which each service is associated to either a pre-determined value or an average number of business factors associated with the services.

10. The method of claim 1, further comprising: enabling display on the display device associated with the second computer system operated by the user a business factor;
enabling display on the display device associated with the second computer system operated by the user a suggested savings rate for the business factor;
receiving, from the second computer system operated by the user, user input representing an estimated savings factor; and
computing a savings according to the estimated savings factor.

11. The method of claim 3, further comprising determining a suggested savings rate and accessing data reflecting cost savings associated with a business factor.

12. Computer-readable medium with program instructions stored thereon that when executed perform the following functions for evaluating business services:
receive a plurality of inputs reflecting business factors that define a business environment for a particular business enterprise, the plurality of inputs including a first set of inputs representing business issues selected from a predetermined group of business issues and a second set of inputs representing business objectives selected from a predetermined group of business objectives;
access one or more data structures which associate technology services with business factors;
mapping, based on the accessed one or more data structures, the first set of inputs representing business issues to technology services to identify relevant services;
mapping, based on the accessed one or more data structures, the second set of inputs representing business objectives to technology services to identify relevant services;
determining a relevancy score for an identified service based on the number of business factors with which the identified service is associated;
determine comparative relevance of the identified services according to relevancy scores of the identified services;
select a subset of the identified services based on comparative relevance of the identified services, the subset representing recommended services to address at least some of the business issues represented in the first set of inputs and the business objectives represented in the second set of inputs;
display the subset of identified services;
display one or more of cost associated with the identified services, cost savings associated with the identified services and return-in-investment associated with the identified services; and
store a business case for implementing the identified services, the business case including the plurality of inputs, the identified subset of services and one or more of the cost associated with the identified services, the cost savings associated with the identified services and the return-in-investment associated with the identified services.

13. The computer-readable medium of claim 12, further comprising instructions to display values reflecting the comparative relevance of each of the services in said subset of services.

14. The computer-readable medium of claim 12, further comprising instructions to access cost information associated with the subset of services and determine a total cost associated with the subset of services.

15. The computer-readable medium of claim 14, further comprising instructions to receive user inputs concerning savings associated with satisfaction of a business objective and calculate a total savings associated with implementation of the subset of services.

16. The computer-readable medium of claim 12, further comprising instructions to display the subset of services, costs associated with the subset of services, savings associated with implementation of the subset of services, and a return on investment associated with the subset of services.

17. The computer-readable medium of claim 12, further comprising instructions to determine a relevance threshold based on the average number of business factors associated with the services.

18. The computer-readable medium of claim 12, wherein the data structures also associate additional values with the services.

19. The computer-readable medium of claim 18, further comprising instructions to access the data structures, identifying the additional values associated with the subset of services, and recommend additional services based on those additional values.

20. The computer-readable medium of claim 12, further comprising instructions to determine the comparative relevance by comparing the number of said business factors with which each service is associated to either a pre-determined value or an average number of business factors associated with the services.

21. The computer-readable medium of claim 12, further comprising instructions to:
display a business factor;
display a suggested savings rate for the business factor;
receive an estimated savings factor; and
compute a savings according to the estimated savings factor.

22. The computer-readable medium of claim 14, further comprising instructions to determine a suggested savings rate and access data reflecting cost savings associated with a business factor.

23. The method of claim 1 wherein receiving a plurality of inputs comprises:
receiving a first set of user inputs selecting one or more displayed predetermined business issues; and
receiving a second set of user inputs selecting one or more displayed predetermined business objectives.

24. The method of claim 23 wherein:
the one or more displayed predetermined business issues are determined based on business issues considered by previous users in the same industry as the particular business enterprise; and
the one or more displayed predetermined business objectives are determined based on business objectives considered by previous users in the same industry as the particular business enterprise.

25. The computer-readable medium of claim 12 wherein the instructions for receiving a plurality of inputs further comprise instructions to:
- receive a first set of user inputs selecting one or more displayed predetermined business issues; and
- receive a second set of user inputs selecting one or more displayed predetermined business objectives.

26. The computer-readable medium of claim 25 further comprising instructions to:
- determine the one or more displayed predetermined business issues based on business issues considered by previous users in the same industry as the particular business enterprise; and
- determine the one or more displayed predetermined business objectives based on business objectives considered by previous users in the same industry as the particular business enterprise.

27. The method of claim 1 wherein executing the computer-based process further comprises:
- accessing, from computer-readable medium, one or more data structures which store safeguarding information relating to protecting investments in technology services;
- based on accessing the one or more data structures which store safeguarding information, determining whether to include a safeguarding service in the subset of the identified service; and
- based on a determination that a safeguarding service is to be included, selecting a safeguarding service to be included in the subset of the identified services.

28. The computer-readable medium of claim 12, further comprising instructions to:
- access, from computer-readable medium, one or more data structures which store safeguarding information relating to protecting investments in technology services;
- based on accessing the one or more data structures which store safeguarding information, determine whether to include a safeguarding service in the subset of the identified service; and
- based on a determination that a safeguarding service is to be included, select a safeguarding service to be included in the subset of the identified services.

* * * * *